United States Patent [19]

Cubbison, Jr.

[11] 3,746,889

[45] July 17, 1973

[54] TRANSMISSION NETWORK EXHIBITING BIQUADRATIC TRANSFER RESPONSE

[75] Inventor: Richard James Cubbison, Jr., Burlington, N.C.

[73] Assignee: Bell Telephone Laboratories, Incorporated, Murray Hill, N.J.

[22] Filed: Jan. 6, 1972

[21] Appl. No.: 215,861

[52] U.S. Cl. ............... 307/295, 328/167, 330/30 R, 333/80 T

[51] Int. Cl. ............................................. H03h 7/10

[58] Field of Search ........... 333/80 R, 80 T, 70 CR; 330/30 R; 307/295; 328/167

[56] References Cited

UNITED STATES PATENTS 3,497,836 2/1970 Daniels ................................ 333/80

3,644,851 2/1972 Daniels ......................... 333/80 T X

*Primary Examiner*—Paul L. Gensler
*Attorney*—W. L. Keefauver et al.

[57] ABSTRACT

A multitransistor circuit equivalent to a modified gyrator network configuration is used to obtain a general biquadratic transfer response. First and second predetermined currents are supplied to the ports of the gyrator and third and fourth currents proportional, respectively, to an applied input signal and to the voltage developed at one of the gyrator ports are supplied to an output resistor in order to obtain a desired output voltage.

16 Claims, 5 Drawing Figures

TRANSMISSION NETWORK EXHIBITING BIQUADRATIC TRANSFER RESPONSE

BACKGROUND OF THE INVENTION

This invention pertains to multifunction transmission networks and, more particularly, to active resistance-capacitance (RC) transmission networks.

Networks devoid of inductors, i.e., inductorless networks, have become increasingly important with the development of integrated circuit technology. Since inductors are not conveniently realized in integrated circuit configurations, the advantages of integrated circuit technology may generally only be applied to those circuits which do not include inductors. It is generally well known that a wide variety of network transfer responses, obtained from passive circuits including inductors, may also be obtained from RC active networks which include only resistors, capacitors and an active element, i.e., an amplifier.

One of the advantages of active RC networks is the ease with which the transmission characteristics of such networks can be simply varied by altering the magnitude of resistors and/or capacitors used in the network. Such networks are therefore of use in applications requiring variable transmission requirements. To be useful, however, in such applications, the characteristics of the network must be variable over a considerable range with high precision. A particular, relatively low frequency, RC network of great interest to those skilled in the art is a network exhibiting a general biquadratic transfer response. See, for example, "Active Filters: New Tools for Separating Frequencies" by L. C. Thomas in *The Bell Laboratories Record*, Vol. 49, No. 4, April 1971, pp. 121–125. The great success of such low frequency active networks, generally referred to as "biquads", has aroused considerable interest in wide-band, i.e., relatively high frequency, active networks which provide similar variety and versatility. Unfortunately, prior art network realizations have been limited to the ranges below 100 kHz because of the use and concomitant limitations of conventional operational amplifiers.

It is an object of this invention to provide active RC network apparatus, the characteristics of which are adjustable over a wide range with a high degree of precision.

It is another object of this invention to realize an adjustable RC network which has a biquadratic transfer response.

It is yet another object of this invention to realize an active adjustable RC network which has a bandwidth of several tens of megahertz.

SUMMARY OF THE INVENTION

These and other objects of this invention are accomplished, in accordance with the principles of this invention, by utilizing a network which incorporates six transistors in a particular circuit configuration to realize a general biquadratic transfer response. More particularly, the network includes a six direct coupled transistors with fixed biasing resistors, and a plurality of adjustable resistors which are used to generalize the response of the transmission network. The equivalent circuit of such a network is a modified gyrator network configuration supplied by a plurality of current sources. The output signal of the network, developed across a load resistor, a common terminal of the gyrator, is proportional to an applied input signal and the signal appearing across one of the ports of the gyrator.

Further features and objects of this invention, its nature and various advantages will be more apparent upon consideration of the attached drawing and the following detailed description.

DETAILED DESCRIPTION OF THE INVENTION

Figure 1:
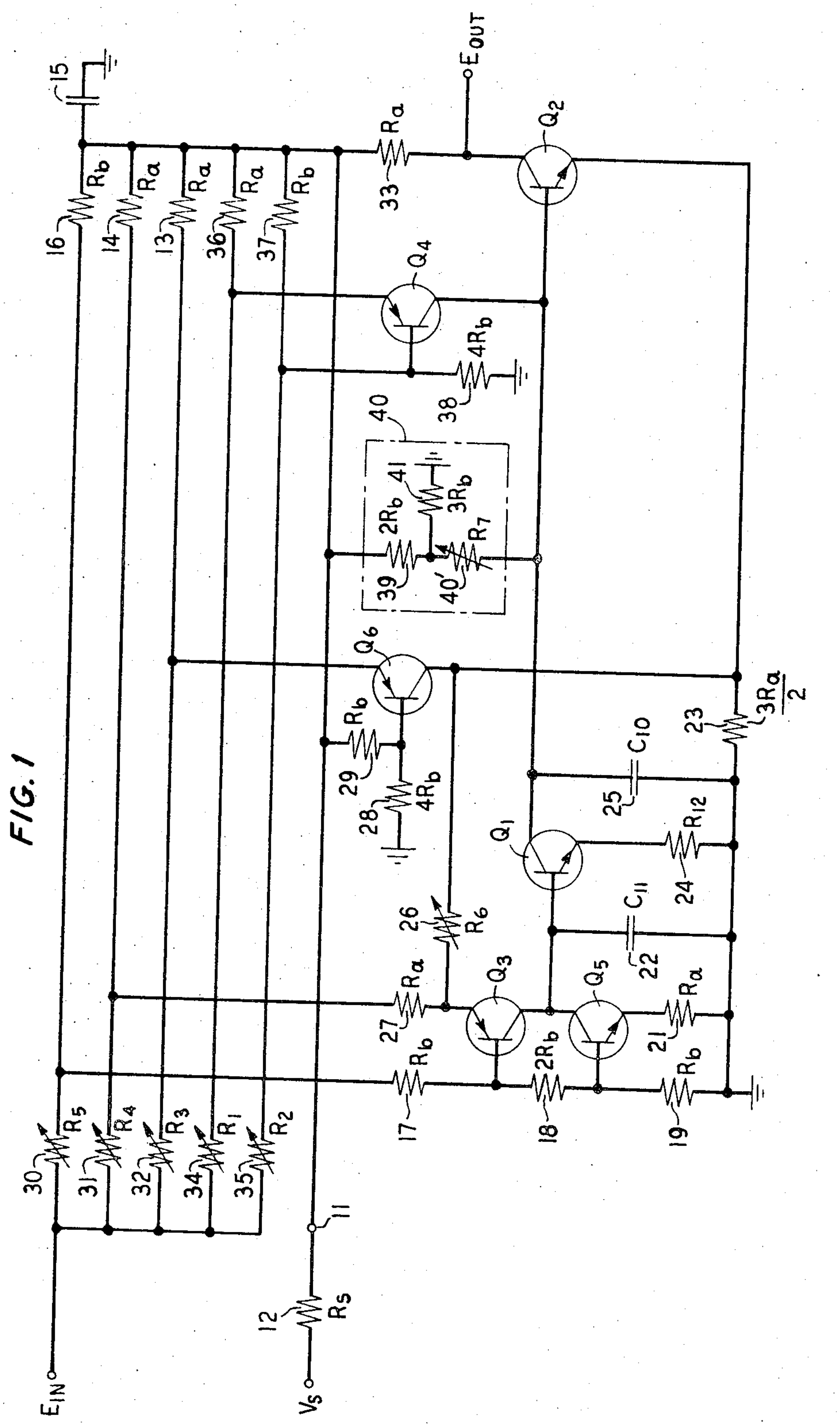
FIG. 1 is a schematic circuit diagram of the multitransistor adjustable active RC network of this invention.

The transmission network of this invention is shown in FIG. 1. The network includes six direct coupled transistors, $Q_1$, $Q_2$, –,$Q_6$, with fixed biasing resistors (alphabetically subscripted) and seven variable tuning resistors (numerically subscripted). The input terminal of the network, $E_{in}$, is connected directly to each of variable resistors $R_1$, $R_2$, $R_3$, $R_4$, and $R_5$ which, in turn, are diversely connected to various terminals of the transistors. The output terminal, $E_{out}$, of the network is connected to the collector of transistor $Q_2$. Power is supplied at a potential $V_S$ to resistor $R_S$ and thence to common source node 11. The functions of the variable resistors $R_1$ through $R_7$ and capacitors $C_{11}$ and $C_{10}$, connected to transistor $Q_1$, will be described hereinafter. Power supply filter capacitor 15 is connected between source node 11 and a terminal of fixed potential, e.g., ground.

As will be shown, the network of this invention provides a general second order transmission characteristic of the form $$T(S)=\frac{E_{out}}{E_{in}}=K_1\frac{S^2+\left(\frac{\omega_p}{Q_p}+K_2\right)S+(\omega_p^2+K_3)}{S^2+\frac{\omega_p}{Q_p}S+\omega_p^2} \qquad (1)$$

where $Q_p$ and $\omega_p$ are the quality factor and radian frequency of the transmission poles, respectively, while the unitless constant $K_1$ is a magnitude factor of the transfer function T(S). Eq. (1) may be expanded to more clearly define the constants $K_2$ and $K_3$, i.e., $$T(S)=K_1\left[1+\frac{K_2S}{S^2+\frac{\omega_p}{Q_p}S+\omega_p^2}+\frac{K_3}{S^2+\frac{\omega_p}{Q_p}S+\omega_p^2}\right] \qquad (2)$$

Thus, $K_2$ and $K_3$ are gain constants which indicate respectively the relative amounts of bandpass and lowpass response which are exhibited by T(S).

Figure 2:
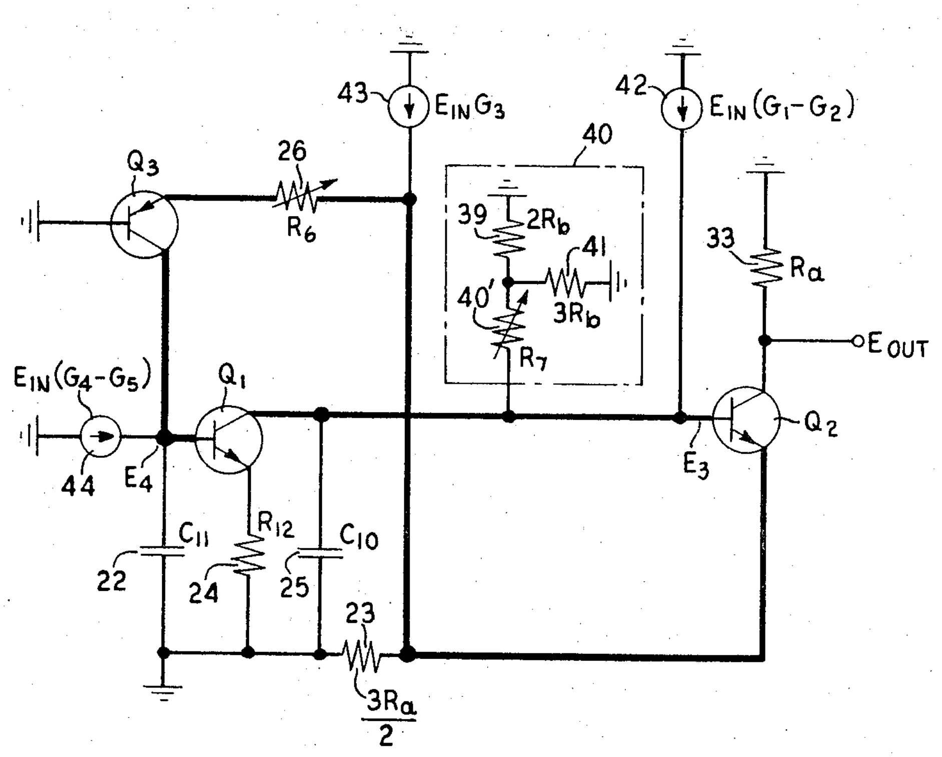
FIG. 2 is an equivalent circuit of the network of FIG. 1.

The ac signal behavior of the network of FIG. 1 will be more readily understood by reference to the equivalent circuit of FIG. 2. With all biasing resistors and sources removed, as is conventional, it is apparent from FIG. 2 that a feedback loop is present in the network of FIG. 1. This loop includes the appropriate junctions of transistors $Q_1$, $Q_2$, and $Q_3$ and resistor $R_6$. Connected to this basic feedback loop are capacitors $C_{11}$ and $C_{10}$ and a resistive network 40 comprising resistors 39, 41, and 40' connected, e.g., in a tee configuration. Also shown connected to the feedback loop are three ideal current sources 42, 43, and 44. These sources are controlled by the input voltage $E_{in}$ and generate currents which are a function of one or more conductances $G_1$ through $G_5$. Source 42 which provides a current $E_{in}(G_1\text{-}G_2)$ represents transistor $Q_4$ and its variable input resistors $R_1$ and $R_2$ of FIG. 1. Source 43 represents transistor $Q_6$ along with its input resistor $R_3$ and has a current magnitude of $E_{in}G_3$. Finally, source 44, supplying a current $E_{in}(G_4\text{-}G_5)$, represents transistor $Q_3$ and its input resistors $R_4$ and $R_5$. Since transistor $Q_3$ forms part of the feedback loop, it has been retained as a transmission path in the equivalent circuit of FIG. 2. Sources 42, 43, and 44 thus provide signals proportional to $E_{in}$ to three nodes of the feedback network of FIG. 2. The network responds to these input signals with resonant nodes which are then summed, as in Eq. 1, to realize the desired transfer function T(S).

The five source conductances $G_1$ through $G_5$ are functions of the input circuitry and are controlled by the variable tuning resistors $R_1$ through $R_5$. Explicit relationships for the various conductances will be presented hereinafter. In addition to providing the resonant modes of Eq. 1, the circuit of FIG. 2 comprises the signal path of the transmission section. It includes a three transistor feedback circuit which is loaded by two capacitors and a resistive network. If the capacitors and resistive network are removed, the feedback circuit can be examined separately as shown by the two port network of FIG. 3.

Figure 3:
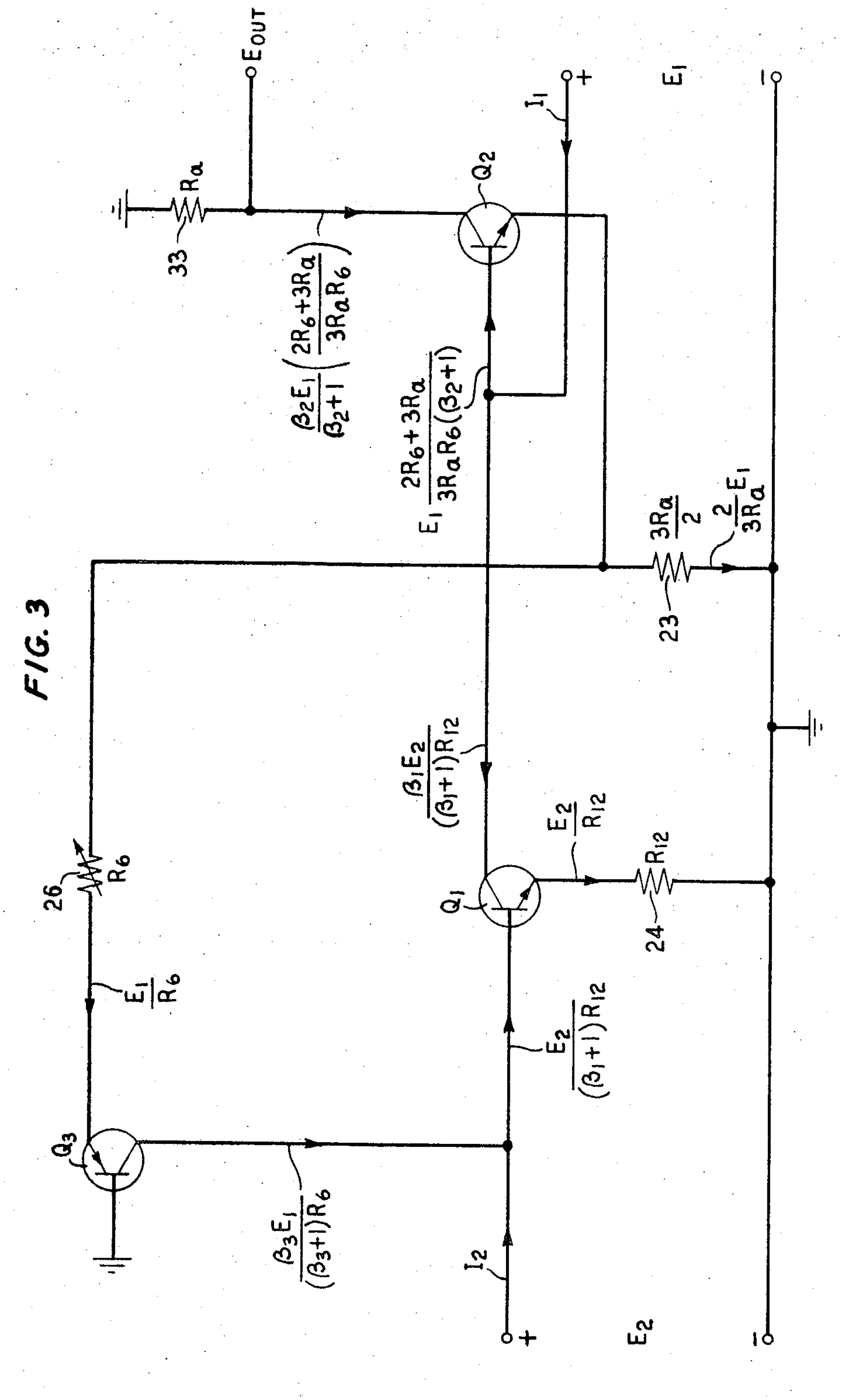
FIG. 3 is an equivalent circuit derived from the circuit of FIG. 2.

In order to simplify the analysis of FIG. 3, the port currents and voltages have been labeled in the conventional two port sense and the branch currents have been evaluated as functions of the port voltages, as indicated. The small signal "*h*" parameters of each transistor are all assumed to be zero with the exception of parameter $h_{fe}$ which has been defined for each transistor by a correspondingly subscripted $\beta$. By applying Kirchkoff's current law to the ports of the network of FIG. 3 there is obtained $$I_1 = ([2R_6 + 3R_a]/[3R_aR_6(\beta_2 + 1)]E_1 + ([\beta_1\ ])/([(\beta_1 + 1)R_{12}])E_2, \qquad (3)$$

$$I_2 = -\ [\beta_3/(\beta_3 + 1)R_6]E_1 + [1/(\beta_1 + 1)R_{12}]E_2. \qquad (4)$$

If Eqs. (3) and (4) are combined, they form the matrix equation $$\begin{bmatrix} I_1 \\ I_2 \end{bmatrix} = \begin{bmatrix} \dfrac{2R_6+3R_a}{3R_aR_6(\beta_2+1)} & \dfrac{\beta_1}{(\beta_1+1)R_{12}} \\ -\dfrac{\beta_3}{(\beta_3+1)R_6} & \dfrac{1}{(\beta_1+1)R_{12}} \end{bmatrix} \begin{bmatrix} E_1 \\ E_2 \end{bmatrix} \qquad (5)$$

which defines the admittance matrix of the feedback circuit of FIG. 3. The elements of the matrix of Eq. (5 are functions of the $\beta$'s, or current gains, of each of the three transistors in the feedback loop. If these current gains are relatively large, as is normally the case, the admittance matrix of Eq. 5 becomes $$Y = \begin{bmatrix} 0 & \dfrac{1}{R_{12}} \\ -\dfrac{1}{R_6} & 0 \end{bmatrix}. \qquad (6)$$

Figure 4:
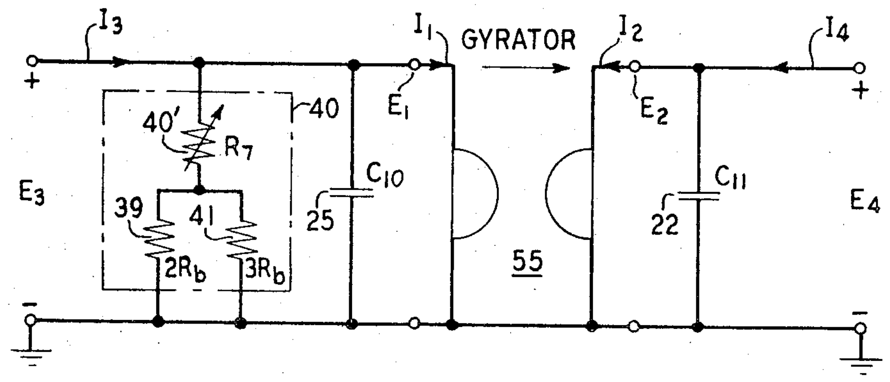
FIG. 4 is an equivalent circuit of the circuit of FIG. 3.

It will be recognized by those skilled in the art that this is the matrix of an active gyrator network. Of course, the matrix of Eq. 5 will also be recognized as an admittance matrix of a lossy gyrator wherein the finite gains of the transistors are responsible for the nonzero main diagonal elements of the matrix. However, for the immediate purposes of analysis, the matrix of Eq. 6 will be utilized. Since the circuit of FIG. 3 exhibits the characteristics of a gyrator network, it has been portrayed in FIG. 4 by conventional symbolism, i.e., device 55, and in addition, capacitors $C_{10}$ and $C_{11}$ of FIG. 2 and the resistive network 40 comprising resistors 39, 41, and 40' has been connected across the ports of the gyrator network as dictated by the circuit of FIG. 2. The admittance matrix of the two port network of FIG. 4 may be derived from Eq. 6 in conjunction with the admittance values of the loads which shunt the ports of the gyrator. If the gyrator loads are evaluated as admittances and added to their respective $Y_{11}$ and $Y_{22}$ matrix elements in Eq. 6 , the admittance matrix of the two port network of FIG. 4 is defined by $$\begin{bmatrix} I_3 \\ I_4 \end{bmatrix} = \begin{bmatrix} SC_{10} + \dfrac{5}{5R_7+6R_b} & \dfrac{1}{R_{12}} \\ -\dfrac{1}{R_6} & SC_{11} \end{bmatrix} \begin{bmatrix} E_3 \\ E_4 \end{bmatrix}. \qquad (7)$$

The impedance matrix may be obtained by proper inversion of Eq. 7 and is given by $$\begin{bmatrix} E_3 \\ E_4 \end{bmatrix} = \begin{bmatrix} \dfrac{1}{C_{10}} \dfrac{S}{S^2+\frac{\omega_p}{Q_p}S+\omega_p^2} & -\dfrac{1}{R_{12}C_{10}C_{11}} \dfrac{1}{S^2+\frac{\omega_p}{Q_p}S+\omega_p^2} \\ \dfrac{1}{R_6C_{10}C_{11}} \dfrac{1}{S^2+\frac{\omega_p}{Q_p}S+\omega^2_p} & \dfrac{1}{C_{11}} \dfrac{S+\frac{5}{(5R_7+6R_b)C_{10}}}{S^2+\frac{\omega_p}{Q_p}S} \end{bmatrix} \begin{bmatrix} I_3 \\ I_4 \end{bmatrix} \qquad (8)$$

where $$\omega_p = 1/\sqrt{R_6 R_{12} C_{10} C_{11}} \qquad (9)$$

and $$Q_D = \frac{5R_7+6R_b}{5\sqrt{R_6R_{12}}}\sqrt{\frac{C_{10}}{C_{11}}} \qquad (10)$$

The transmission poles of the transfer function of the subject network are contributed by the lowpass and bandpass resonant modes of Eq. 8. These resonant modes are excited by sources 42 and 44 of FIG. 2, which provide input signals that are related to the port currents of the network of FIG. 4 by $$I_3 = E_{in}(G_1-G_2), \qquad (11)$$

$$I_4 = E_{in}(G_4-G_5). \qquad (12)$$

By proper substitution and collection of terms, the port voltages of FIG. 4 can be expressed as functions of $E_{in}$ by $$E_3 = \frac{E_{in}}{C_{10}} \cdot \frac{(G_1-G_2)S - \frac{1}{R_{12}C_{11}}(G_4-G_5)}{S^2+\frac{\omega_D}{Q_D}S+\omega_D^2} \qquad (13)$$

$$E_4 = \frac{E_{in}}{C_{11}} \cdot \frac{\frac{1}{R_5C_{10}}(G_1-G_2)+(G_4-G_5)\left(S+\frac{5}{(5R_7+6R_b)C_{10}}\right)}{S^2+\frac{\omega_D}{Q_D}S+\omega_D^2} \qquad (14)$$

From an examination of FIG. 2, it is clear the output voltage $E_{out}$ of the transmission network is related by a constant of proportionality to the base voltage of transistor $Q_2$ which is defined as $E_3$. If the current gain, $h_{fe}$, of transistor $T_2$ is relatively large, $E_{out}$ may be expressed in terms of $E_3$ by $$E_{out} = -([2R_6+3R_a]/[3R_6])\,E_3 \qquad (15)$$

Eliminating the term $E_3$ from Eqs. 13 and 15, that portion of the output response of the network which is contributed by sources 42 and 44 may be expressed as $$\frac{E_{out}}{E_{in}} = \frac{\frac{(G_2-G_1)(2R_6+3R_a)}{3R_6C_{10}}S + \frac{(G_4-G_5)(2R_6+3R_a)}{3R_6R_{12}C_{10}C_{11}}}{S^2+\frac{\omega_D}{Q_D}S+\omega_D^2} \qquad (16)$$

Comparing Eqs. 2 and 16, it is evident that sources 42 and 44 are responsible for the lowpass and bandpass responses of the transfer function T(S). In addition, the conductance terms $G_1$, $G_2$, $G_4$ and $G_5$ generalize the magnitude and sign of these responses. It is also evident that Eq. 16 does not account for the feedthrough, i.e., constant term of Eq. 2. This portion of the response is developed by the third source of FIG. 2, i.e., source 43.

Figure 5:
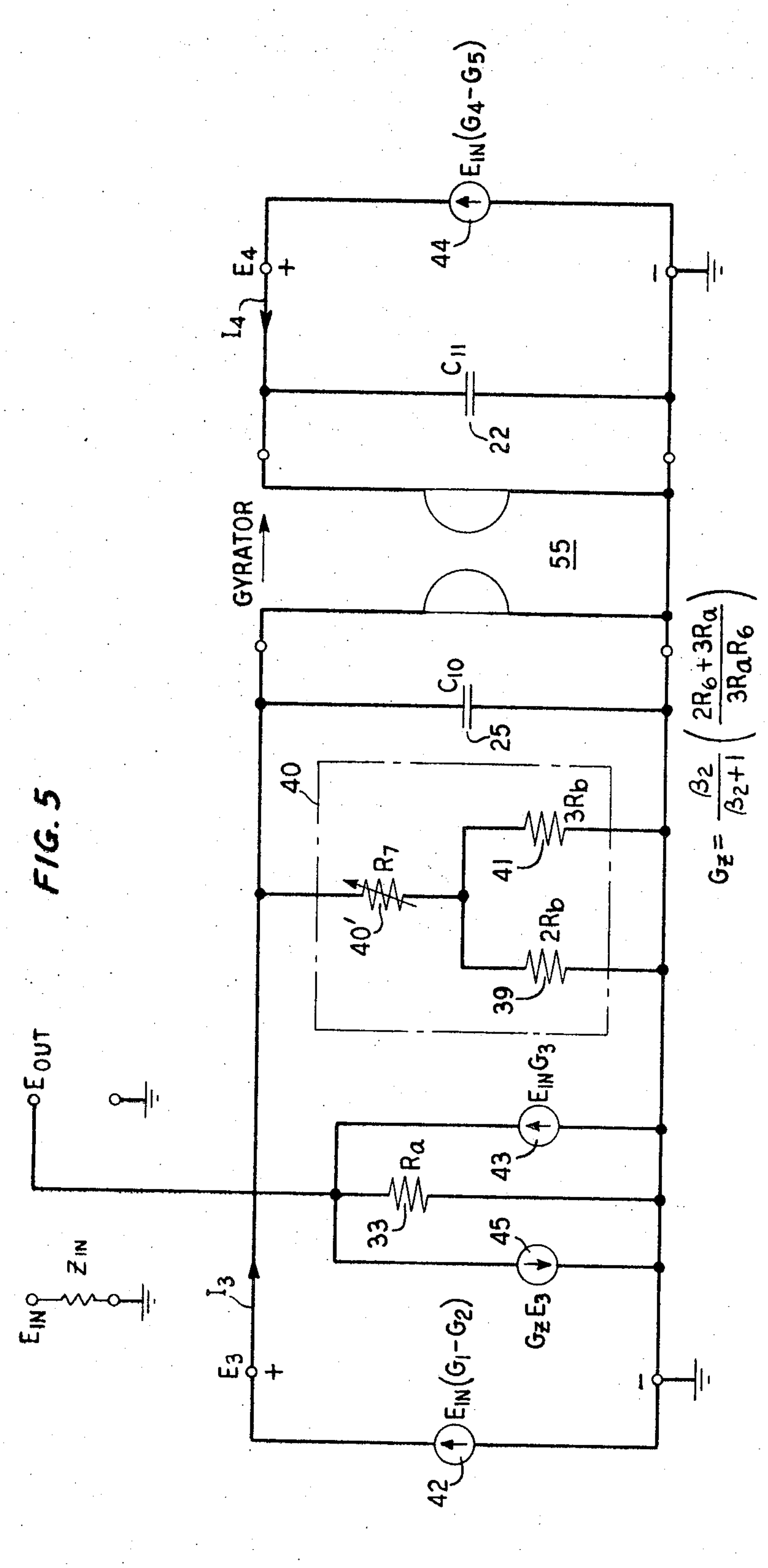
FIG. 5 is a further equivalent circuit of the network of FIG. 1.

FIG. 5 depicts the two port network of FIG. 4 with the addition of current sources 42, 43, 44, new equivalent current source 45, and resistor 33. Aslo shown are the input and output terminals of the transmission network of FIG. 1, with $Z_{in}$ being the equivalent input impedance at the input terminal of the transmission network of FIG. 1. Referring to FIG. 2, source 45 represents that current flowing through resistor 33 which is a function of the base voltage $E_3$ of transistor $Q_2$. As indicated in FIG. 5, the current from source 43 also feeds through resistor 33 since the emitter-collector path of transistor $Q_2$ offers very little impedance in comparison with the alternate route through resistor $R_6$. The output terminal of the transmission network is connected to resistor 33 as indicated in FIGS. 1 and 5. Accordingly, the current from source 43 generates a superposed voltage $E_{in}R_aG_3$ at the output terminal of the network. When this additional response is added to the lowpass and bandpass responses of Eq. (16), the general biquadratic response of the transmission network is derived as given by Eq. (2) where $$K_1 = R_aG_3 \qquad (17)$$

$$K_2 = [(G_2-G_1)\,(2R_6+3R_a)]/3R_aG_3R_6C_{10} \qquad (18)$$

$$K_3 = [(G_4-G_5)(2R_6+3R_a)]/3R_aG_3R_6R_{12}C_{10}C_{11} \qquad (19)$$

$$\omega_D = \frac{1}{\sqrt{R_6R_{12}C_{10}C_{11}}} \qquad (20)$$

and $$Q_D = \frac{5R_7+6R_b}{5\sqrt{R_6R_{12}}}\sqrt{\frac{C_{10}}{C_{11}}} \qquad (21)$$

The constants defined by Eqs. 17 through 21 were derived based on the assumption that the current gain parameter $h_{fe}$ of each transistor in FIG. 1 is relatively large. Thus, the admittance matrix of Eq. 6 was used instead of the matrix of Eq. 5 in deriving the desired transfer function. If, however, the matrix of Eq. 5 is used, the constants of Eq. 2 are then defined as:

$$K_1 = R_aG_3(\beta_2/[\beta_2+1]) \quad (22)$$

$$K_2 = [(G_2-G_1)(2R_6+3R_a)]/3R_aG_3R_6C_{10} \quad (23)$$

$$K_3 = [(G_4-G_5)(2R_6+3R_a)]/[3R_aG_3R_6R_{12}C_{10}C_{11}]+[(G_2-G_1)(2R_6+3R_a)]/[3R_aG_3R_6R_DC_{10}C_{11}] \quad (24)$$

$$\omega_D = \frac{1}{\sqrt{R_6R_{12}C_{10}C_{11}}}\sqrt{1+\frac{R_6R_{12}}{R_CR_D}} \quad (25)$$

$$Q_D = \frac{1}{R_6R_{12}}\frac{C_{10}}{C_{11}}\left\{\frac{R_C\left(1+\frac{R_6R_{12}}{R_CR_D}\right)}{1+\frac{C_{10}R_C}{C_{11}R_D}}\right\} \quad (26)$$

where $$R_C = [3R_aR_6(\beta_2+1)(5R_7+6R_b)]/[15(\beta_2+1)R_aR_6+(3R_a+2R_6)(5R_7+6R_b)] \quad (27)$$

and $$R_D = (\beta_1+1)R_{12} \quad (28)$$

The effects of the derived constants upon the transmission zeros of the transfer response T(S) are more lucidly perceived when Eq. 2 is converted to a single fraction of the form $$T(S) = K_1\frac{S^2+AS+B}{S^2+\frac{\omega_D}{Q_D}S+\omega_D^2} \quad (29)$$

where $$A = (\omega_p)/(Q_p) + K_2 \quad (30)$$

and $$B = \omega_p^2 + k_3 \quad (31)$$

When the transmission zeros of Eq. 29 are complex, the quality factor $Q_o$ and radian frequency $\omega_o$ are related to A and B by $$\omega_o = \sqrt{B} = \sqrt{\omega_p^2 + K_3}, \quad (32)$$

and $$Q_o = \frac{\sqrt{B}}{A} = \frac{\sqrt{\omega_D^2+K_3}}{\frac{\omega_D}{Q_D}+K_2} \quad (33)$$

To facilitate the design of a given network, it is generally necessary to realize a transfer response given in the form, for example, of Eq. 29. To aid in such a design, the variable resistors, i.e., tuning resistors $R_1$ through $R_7$, may be written as functions of the fixed resistors of the network of FIG. 1 and the coefficients of the desired transfer function. Accordingly, the following design equations may generally be used.

*If* $A \le \frac{\omega_D}{Q_D}$, $$R_1 = \frac{2R_6+3R_a}{3R_aG_3R_5C_{10}\left(\frac{\omega_D}{Q_D}-A\right)} \quad (34)$$

and $$R_2 = \infty. \quad (35)$$

If $$A \ge (\omega_p/Q_p),\ R_1 = \infty, \quad (36)$$

and $$R_2 = \frac{4R_b(2R_6+3R_a)}{15R_a^2G_3R_6C_{10}\left(A-\frac{\omega_D}{Q_D}\right)} - \frac{4R_b}{5} \quad (37)$$

If $B \ge \omega_p^2$, $$R_4 = [2R_6 + 3R_a]/[6R_aG_3R_6R_{12}C_{10}C_{11}(B-\omega_p^2)](R_a)/(2), \quad (38)$$

$$\text{and } R_5 = \infty. \quad (39)$$

If $$B \le \omega_p^2,\ R_4 = \infty, \quad (40)$$

and $$R_5 = [(2R_6+3R_a)(6R_aR_6+5R_6R_b)]/[30R_a^2G_3R_6^2R_{12}C_{10}C_{11}(\omega_p^2-B)]4R_b/5$$

In all cases, $$R_3 = R_a/K_1, \quad (42)$$

$$R_6 = (1)/(\omega_p^2R_{12}C_{10}C_{11}), \quad (43)$$

and $$R_7 = [(Qhd\ p)/(\omega_p C_{10})] - [(6R_b)/(5)]. \quad (44)$$

The double valued results obtained for resistor values $R_1$, $R_2$, $R_4$, and $R_5$ are a result of the conductance difference terms in Eqs. 18 and 19. These terms determine the sign of $K_2$ and $K_3$ and therefore allow greater freedom in the positioning of the poles and zeros of the transfer function. Consider, for example, the numerator coefficient A in Eq. (30). If A is to be less than $\omega_{p/Qp}$, $K_2$ must be negative. If the term $G_2 - G_1$ were not present in the relationship for $K_2$, Eq. 18 however, this would not be possible. Furthermore, since $G_2$ in Eq. 18 serves only to degrade the magnitude of the term $K_2$ for this case, i.e., $(A < \omega_p/Q_p)$, $G_2$ may be set equal to zero. In order to further understand the above, the conductance terms may be expressed as functions of their respective tuning resistors, i.e., $$G_1 = 1/R_1, \quad (45)$$

$$G_2 = [4R_b]/[R_a(5R_2+4R_b)], \quad (46)$$

$$G_3 = 1/R_3, \quad (47)$$

$$G_4 = [1]/[2R_4 + R_a], \quad (48)$$

$$G_5 = [6R_aR_b + 5R_6R_b]/[2R_aR_6(5R_5+4R_b)]. \quad (49)$$

For example, resistor value $R_2$ must approach infinity in order to eliminate the term $G_2$ from Eq. 18 and thereby guarantee a negative sign for the term $K_2$. The number of resistors needed for tuning may thus be reduced from seven to five for a specific set of coefficients. Also, the tuning equations may be expressed as functions of the transmission pole and zero frequencies and quality factors if $\omega_o/Q_o$ and $\omega_o{}^2$ are substituted for A and B, respectively, in Eqs. 34 through 44. This approach identifies the adjustments which influence more than one parameter and also serves to indicate whether the variable resistors must be increased or decreased to close on a specific desired result.

The alphabetically subscripted resistors of FIG. 1 are responsible for the quiescent bias levels within the network. Since the quiescent stat is a significant design consideration where wideband transistors are involved, the circuit configuration of these resistors has been chosen to provide the fullest possible range of collector currents and voltages. In addition, the bias circuit configuration must be such that wide tuning variations do not upset or even alter the quiescent levels in the network. To prevent the interaction between tuning adjustments and the quiescent state of the network, the tuning and biasing resistors have been arranged to provide a zero quiescent voltage drop across each of the variable resistors. This allows the variable resistors to be tuned through their entire range without interfering with the currents and voltages which stabilize the quiescent state of the network. The supply voltage $V_S$, applied to the network of FIG. 1, and resistor $R_S$, are functions of the bias voltage $V_{CE}$ and collector current $I_C$ which are chosen for the transistors in FIG. 1. The biasing structure has been designed to provide a bias voltage $V_{CE}$ for each transistor when $V_S$ is six times $V_{CE}$. The source current $I_S$ and the value of resistor $R_S$ are given by $$I_S = 4V_{CE}\ (1)/(R_a) + (1)/(R_b), \quad (50)$$

and $$R_S = [R_aR_b]/[4(R_a+R_b)]. \quad (51)$$

For illustrative purposes, the design of a transmission network exhibiting an elliptic function transmission characteristic given by $$T(S) = K_1 \frac{S^2+B}{S^2+\frac{\omega_p}{Q_p}S+\omega_p{}^2} \quad (52)$$

will be considered. Reference to Eq. 32 indicates that the transmission zeros of this function occur at B radians, while $\omega_p$ and $Q_p$ are the radian frequency and quality factor, respectively, of the transmission pole pair. Since the numerator coefficient A is zero in Eq. 52, the quality factor $Q_o$ of the transmission zero must be infinite as defined by Eq. 33. In a particular embodiment the following values were used.

Table I $K_1 = 1$
$\omega_o = \sqrt{B} = 100$ kHz
$\omega_p = 150$ kHz
$Q_p = 10$
$R_a = 1$ KΩ
$R_b = 2$ KΩ
$R_{12} = 2R_a = 2$ KΩ

The selection of the values for the variable resistors of the circuit follows in an orderly manner. For example, the value for resistor $R_6$ should be selected first for its magnitude influences the value of the remaining resistors. With reference to Eq. 43, resistor $R_6$ may be chosen to satisfy requirements which are independent of $\omega_p$ due to the flexibility which is introduced by the terms $C_{10}$ and $C_{11}$. If resistor $R_6$ is required to be equivalent to $R_{12}$, for example, $C_{10}$ *and* $C_{11}$ must satisfy $$C_{10}\,C_{11} = (1)/(\omega_p{}^2\,R_{12}{}^2). \quad (53)$$

If the capacitors are to be equivalent, Eq. 53 may be solved to obtain $$C_{10} = C_{11} = 530.5 \times 10^{-12}\ f. \quad 54$$

With the value of capacitor $C_{10}$ from Eq. 54, Eq. 44 may be solved to evaluate resistor $R_7$ which then becomes $$R_7 = 16{,}600\Omega. \quad (55)$$

From Table I, the value of B is less than $\omega_p^2$; this requires that resistor $R_4$ be removed from the network as indicated by Eq. 40. The value of resistor $R_5$ is provided by Eq. 41, i.e., $$R_5 = 5{,}120\Omega . \quad (56)$$

Since the magnitude of A is zero for the elliptic function case, Eqs. 34 and 35 determine the value of resistors $R_1$ and $R_2$. When evaluated, Eq. 34 yields $$R_1 = 23{,}400\Omega . \quad (57)$$

The value of resistor $R_3$ determines the transmission gain and can be obtained from Eq. 42, i.e., $$R_3 = 1\ K\Omega . \quad (58)$$

The above example is only one of the many transfer responses that are obtainable from the transmission network of FIG. 1. In general, the network of this invention provides biquadratic responses having independently tuned peaks of loss and gain through the band of frequencies from audio to several tens of megahertz. The network further provides full range resistive tuning of poles and zeros without gain or frequency compensation, while providing resistive input and output terminations for impedance matching with passive sections.

What is claimed is:

1. Multifunction transmission apparatus, responsive to an applied signal and having an output terminal, comprising:

a gyrator having a first terminal pair and a second terminal pair, one of each of said terminal pairs connected to a terminal of fixed potential;

a first capacitor connected across said gyrator first terminal pair;

a second capacitor connected across said gyrator second terminal pair;

a resistive network connected across said gyrator first terminal pair;

a first current source, for supplying a first predetermined current, connected across said gyrator first terminal pair;

a second current source, for supplying a second predetermined current, connected across said gyrator second terminal pair;

a resistor connected between said output terminal and said terminal of fixed potential;

a third current source, for supplying a third predetermined current, connected across said resistor; and a fourth current source, for supplying a fourth predetermined current, connected across said resistor.

2. The apparatus defined in claim 1 wherein said first, second, and third current sources supply currents respectively proportional to the magnitude of said applied signal; and said fourth current source supplies a current proportional to the magnitude of the signal appearing across said gyrator first terminal pair.

3. Transmission apparatus responsive to an applied signal and having an output terminal comprising:

a gyrator having a first terminal pair and a second terminal pair;

a first capacitor connected across said gyrator first terminal pair;

a second capacitor connected across said gyrator second terminal pair;

an impedance network connected across said gyrator first terminal pair;

a first current source connected across said gyrator first terminal pair;

a second current source connected across said gyrator second terminal pair;

an impedance element connected between said output terminal and one terminal of said first terminal pair;

a third current source connected across said impedance element; and a fourth current source connected across said impedance element.

4. The apparatus defined in claim 3 wherein said first, second, and third current sources supply currents respectively proportional to the magnitude of said applied signal; and said fourth current source supplies a current proportional to the magnitude of the signal appearing across said gyrator first terminal pair.

5. A transmission network responsive to an applied signal and having an output terminal comprising:

a gyrator having a first terminal pair and a second terminal pair;

a first impedance element connected across said gyrator first terminal pair;

a second impedance element connected across said gyrator second terminal pair;

an impedance network connected across said gyrator first terminal pair;

a first current source connected across said gyrator first terminal pair;

a second current source connected across said gyrator second terminal pair;

a third impedance element connected between said output terminal and one terminal of said first terminal pair;

a third current source connected across said third impedance element; and a fourth current source connected across said third impedance element.

6. The network defined in claim 5 wherein said first, second, and third current sources supply currents respectively proportional to the magnitude of said applied signal; and said fourth current source supplies a current proportional to the magnitude of the signal appearing across said gyrator first terminal pair.

7. A transmission network responsive to an applied signal and having an output terminal comprising:

an equivalent gyrator having a first terminal pair and a second terminal pair;

a first impedance connected across said gyrator first terminal pair;

a second impedance connected across said gyrator second terminal pair;

a first equivalent signal source connected across said gyrator first terminal pair;

a second equivalent signal source connected across said gyrator second terminal pair;

a third impedance connected between said output terminal and one of said gyrator terminals; and means for developing across said third impedance a signal proportional to said applied signal and the signal appearing across one of said gyrator terminal pairs.

8. Transmission apparatus responsive to an applied input signal comprising:

a gyrator having first and second ports;

a first capacitor connected across said gyrator first port;

a second capacitor connected across said gyrator second port;

an impedance network connected across said gyrator first port;

a first current source for supplying a current, proportional to said input signal, connected across said gyrator first port;

a second current source for supplying a current, proportional to said input signal, connected across said gyrator second port;

an impedance element having one terminal connected to an output terminal of said transmission apparatus and another terminal connected to one terminal of said gyrator first port;

a third current source, for supplying a current proportional to said input signal, connected across said impedance element;

and a fourth current source, for supplying a current proportional to the potential appearing across said gyrator first port, connected across said impedance element.

9. A transmission network responsive to an applied input signal comprising:

a gyrator having first and second ports;

a first impedance element connected across said gyrator first port;

a second impedance element connected across said gyrator second port; an impedance network connected across said gyrator first port;

a first current source for supplying a current proportional to said input signal connected across said gyrator first port;

a second current source for supplying a current proportional to said input signal connected across said gyrator second port;

a third impedance element having one terminal connected to the output terminal of said transmission network and another terminal connected to one terminal of said gyrator first port;

a third current source for supplying a current proportional to said input signal connected across said third impedance element;

and a fourth current source, for supplying a current proportional to the potential appearing across said gyrator first port, connected across said third impedance element.

10. A transmission network responsive to an applied input signal comprising:

a gyrator having first and second ports;

a first capacitor connected across said gyrator first port;

a second capacitor connected across said gyrator second port;

a resistive network connected across said gyrator first port;

a first current source for supplying a current, proportional to said input signal, connected across said gyrator first port;

a second current source for supplying a current, proportional to said input signal, connected across said gyrator second port;

a resistor having one terminal connected to an output terminal of said transmission network and another terminal connected to one terminal of said gyrator first port;

a third current source for supplying a current proportional to said input signal connected across said resistor;

and a fourth current source, for supplying a current proportional to the potential appearing across said gyrator first port, connected across said resistor.

11. Transmission apparatus responsive to an applied input signal comprising:

a gyrator having first and second ports;

a first impedance connected across said gyrator first port;

a second impedance connected across said gyrator second port;

a first signal source for exciting said gyrator first port;

a second signal source for exciting said gyrator second port;

an output impedance element having one terminal connected to the output terminal of said transmission apparatus and another terminal connected to one terminal of said gyrator first port; and means for developing across said output impedance element a signal proportional to said applied input signal and the signal voltage developed at said gyrator first port.

12. A transmission network, responsive to an applied input signal, including first, second, and third transistors and a terminal of fixed potential, comprising:

a first capacitor connected between the collector of said first transistor and said terminal of fixed potential;

a first resistor connected between the emitter of said first transistor and said terminal of fixed potential;

a first resistive network connected between said terminal of fixed potential and a common terminal of the collector of said first transistor and the base of said second transistor;

a second resistor connected between the emitter of said second transistor and said terminal of fixed potential;

a third resistor connected between the collector of said second transistor and said terminal of fixed potential, the output terminal of said transmission network connected to the collector of said second transistor;

a fourth resistor connected between the emitter of said second transistor and the emitter of said third transistor, the base of said third transistor connected to said terminal of fixed potential;

a second capacitor connected between said terminal of fixed potential and a common terminal of the base of said first transistor and the collector of said third transistor;

a first current source for supplying a current proportional to said input signal connected between said terminal of fixed potential and the base of said second transistor;

a second current source for supplying a current proportional to said input signal connected between said terminal of fixed potential and the emitter of said second transistor;

and a third current source for supplying a current proportional to said input signal connected between said terminal of fixed potential and said common terminal of the base of said first transistor and the collector of said third transistor.

13. A transmission network including first, second, and third transistors and a terminal of fixed potential, comprising:

a first capacitor connected between the collector of said first transistor and said terminal of fixed potential, the emitter of said first transistor connected to said terminal of fixed potential;

a first resistive network connected between said terminal of fixed potential and a common terminal of the collector of said first transistor and the base of said second transistor, the emitter of said second transistor connected to said terminal of fixed potential and the output terminal of said transmission network connected to the collector of said second transistor;

a resistor connected between the emitter of said second transistor and the emitter of said third transistor, the base of said third transistor connected to said terminal of fixed potential;

a second capacitor connected between said terminal of fixed potential and a common terminal of the base of said first transistor and the collector of said third transistor;

a first current source connected between said terminal of fixed potential and the base of said second transistor;

a second current source connected between said terminal of fixed potential and the emitter of said second transistor; and a third current source connected between said terminal of fixed potential and said common terminal of said base of said first transistor and the collector of said third transistor.

14. A transmission network having an input terminal, an output terminal, a terminal of fixed potential, a source node, and including first, second, third, fourth, fifth, and sixth transistors comprising:

a first capacitor connected between the collector of said first transistor and said terminal of fixed potential;

a first resistor connected between the emitter of said first transistor and said terminal of fixed potential;

a resistive network having one terminal connected to said terminal of fixed potential, another terminal connected to said source node, and a third terminal connected to a common terminal of the collector of said first transistor, the base of said second transistor, and the collector of said fourth transistor;

a second resistor connected between the emitter of said second transistor and said terminal of said fixed potential;

a third resistor connected between the collector of said second transistor and said source node, the output terminal of said network connected to the collector of said second transistor;

a fourth resistor connected between the base of said fourth transistor and said source node;

a fifth resistor connected between the emitter of said fourth transistor and said source node;

a sixth resistor connected between the base of said sixth transistor and said source node;

a seventh resistor connected between the base of said sixth transistor and said terminal of fixed potential;

an eighth resistor connected between the emitter of said sixth transistor and said source node;

a ninth resistor having one terminal connected to said source node;

a tenth resistor connected between the other terminal of said ninth resistor and the emitter of said third transistor;

an 11th resistor having one terminal connected to said source node;

a 12th resistor connected between the other terminal of said eleventh resistor and the base of said third transistor;

a 13th resistor connected between the base of said third transistor and the base of said fifth transistor, the collectors of said third and fifth transistors connected in common; a 14th resistor connected between the base of said fifth transistor and said terminal of fixed potential;

a 15th resistor connected between the emitter of said fifth transistor and said terminal of fixed potential;

a 16th resistor connected between the base of said fourth transistor and said terminal of fixed potential;

a second capacitor having one terminal connected to said terminal of fixed potential and the other terminal connected to a common terminal of the base of said first transistor and the collector of said fifth transistor;

a 17th resistor connected between the emitter of said fourth transistor and said input terminal;

an 18th resistor connected between the base of said fourth transistor and said input terminal;

a 19th resistor connected between the emitter of said sixth transistor and said input terminal;

a 20th resistor connected between said input terminal and the common terminal of said ninth and tenth resistors;

a 21st resistor connected between said input terminal and the common terminal of said eleventh and twelfth resistors; and a 22nd resistor connected between the emitter of said third transistor and a common terminal of the emitter of said second transistor and the collector of said sixth transistor.

15. The network of claim 14 further including a source of fixed potential and a 23rd resistor connecting said source to said source node.

16. A transmission network having an input terminal, an output terminal, a first common circuit node, a second common circuit node, and including first, second, third, fourth, fifth, and sixth transistors comprising:

a first capacitor connected between the collector of said first transistor and said first node, the emitter of said first transistor connected to said first node;

an impedance network connected between said second node and a common terminal of the collector of said first transistor, the base of said second transistor, and the collector of said fourth transistor;

the emitter of said second transistor connected to said first node, the collector of said second transistor connected to said second node, the output terminal of said network connected to the collector of said second transistor, the base of said fourth transistor connected to said second node, the emitter of said fourth transistor connected to said second node, the base of said sixth transistor connected to said second node, the base of said sixth transistor connected to said second node;

a first resistor having one terminal connected to said second node;

a second resistor connecting the other terminal of said first resistor and the emitter of said third transistor;

a third resistor having one terminal connected to said second node;

a fourth resistor connecting the other terminal of said third resistor and the base of said third transistor, the base of said third transistor connected to the base of said fifth transistor, the collectors of said third and fifth transistors connected in common, the base of said fifth transistor connected to said first node, the emitter of said fifth transistor connected to said first node;

a second capacitor having one terminal connected to said first node and the other terminal connected to a common terminal of the base of said first transistor and the collector of said fifth transistor;

a fifth resistor connected between the emitter of said fourth transistor and said input terminal;

a sixth resistor connected between the base of said fourth transistor and said input terminal;

a seventh resistor connected between the emitter of said sixth transistor and said input terminal;

an eighth resistor connected between said input terminal and the common terminal of said first and second resistors;

a ninth resistor connected between said input terminal and the common terminal of said third and fourth resistors; and a tenth resistor connected between the emitter of said third transistor and a common terminal of the emitter of said second transistor and the collector of said sixth transistor.

* * * * *